United States Patent
Schultz

(10) Patent No.: US 8,687,501 B1
(45) Date of Patent: Apr. 1, 2014

(54) AUTOMATIC DETECTION AND CONFIGURATION OF ETHERNET OAM PROTOCOLS

(75) Inventor: Adam Phillip Schultz, Morrisville, NC (US)

(73) Assignee: Overture Networks, Inc., Morrisville, NC (US)

(*) Notice: Subject to any disclaimer, the term of this patent is extended or adjusted under 35 U.S.C. 154(b) by 127 days.

(21) Appl. No.: 13/557,738

(22) Filed: Jul. 25, 2012

(51) Int. Cl.
*G01R 31/08* (2006.01)

(52) U.S. Cl.
USPC ........ 370/241.1; 370/242; 370/465; 370/254; 370/241

(58) Field of Classification Search
None
See application file for complete search history.

(56) References Cited

U.S. PATENT DOCUMENTS

| | | | |
|---|---|---|---|
| 7,688,742 B2 * | 3/2010 | Sridhar et al. | 370/241.1 |
| 7,898,982 B2 * | 3/2011 | Sridhar et al. | 370/254 |
| 7,996,559 B2 | 8/2011 | Mohan | |
| 2008/0016402 A1 * | 1/2008 | Harel et al. | 714/43 |
| 2008/0049628 A1 * | 2/2008 | Bugenhagen | 370/244 |
| 2008/0279105 A1 * | 11/2008 | Absillis et al. | 370/236.2 |

OTHER PUBLICATIONS

LAN/MAN Standard Committee of the IEEE Computer Society, IEEE Std 802.1ag-2007 IEEE Standard for Local and Metropolitan Area Networks—Virtual Bridged Local Area Networks—Amendment 5: Connectivity Fault Management (Sections 18, 20, and 21) 77 pp. 117-124, 137-183, and 185-206, IEEE.

ITU-T Study Group 13, ITU-T Rec. Y.1731 (Feb. 2008) OAM functions and mechanisms for Ethernet based networks, pp. 6-24, 30-54.

\* cited by examiner

*Primary Examiner* — Duc C Ho
(74) *Attorney, Agent, or Firm* — Kevin E. Flynn; Flynn IP Law

(57) ABSTRACT

The disclosure teaches a method of implementing a system that dynamically learns and applies local configuration for Ethernet OAM. The disclosed system eliminates complexity inherent with standards based Ethernet OAM, therefore reducing errors and enhancing the overall usability of the Ethernet OAM infrastructure.

53 Claims, 6 Drawing Sheets

AUTOMATIC DETECTION AND CONFIGURATION OF ETHERNET OAM PROTOCOLS

BACKGROUND

1. Field of the Disclosure

This disclosure relates generally to networks. More particularly, the disclosure relates to Ethernet operations, administration and maintenance (Ethernet OAM or sometimes EOAM). Ethernet OAM protocols handle installing, monitoring, and troubleshooting Ethernet networks.

Ethernet OAM as currently defined in IEEE standard 802.1ag "Connectivity Fault Management", incorporated herein by reference, defines a connectivity fault management protocols for use in Ethernet networks. The functions of that protocol include: continuity check, link trace, and loopback protocols. An analogous standard with performance monitoring metrics and messages is defined in ITU-T Y.1731—"Requirements for OAM in Ethernet Networks", also herein incorporated by reference. Additional potentially relevant work is ongoing in ITU-T Study Group 13 (often "SG 13").

While the IEEE 802.1ag standard and the ITU-T Y.1731 address similar concepts, they frequently use different terms. However, a person of ordinary skill in the art is able to understand a concept expressed using the terms unique to either standard. For simplicity, the application that follows uses the terminology from the IEEE 802.1 ag standard. The largely corresponding terms found in ITU-T Y.1731 are set forth below.

| IEEE 802.1ag | ITU Y.1731 |
|---|---|
| MD (Maintenance Domain) | MEL (Maintenance Entity Level) |
| MA (Maintenance Association) | MEG (Maintenance Entity Group) |
| MEP (Maintenance End Point) | MEP (Maintenance End Point) |
| MIP (Maintenance Intermediate Point) | MIP (Maintenance Intermediate Point) |
| Port | External Interface (UNI, NNI) |

Note, the application and the expressions of the scope of inventive concepts that follow use the term EVC (Ethernet Virtual Circuit) which is not defined per se in the IEEE standard. EVC is a well-understood term to those of skill in the art. The term EVC includes both point to point and multipoint Ethernet network configurations.

Thus, while expressions of the scope of inventive concepts from this application may use terms from one particular standard, unless explicitly noted to the contrary, these expressions of the scope of inventive concepts are intended to apply to the IEEE 802.1 ag standard and the ITU-T Y.1731 standard, and their successors, including any new or proprietary standards that partially implement these standards. Likewise, the expressions of the scope of inventive concepts should be interpreted to apply to any new standard that provides guidance for the relevant concepts currently found in the IEEE 802.1 ag standard and the ITU-T Y.1731 standard, even if that new standard (like the ITU-T Y.1731 standard) does not use the terminology used in the IEEE 802.1 ag standard.

2. Background

Connectivity Fault Management (CFM).

Connectivity Fault Management (CFM), as used in the IEEE 802.1ag and standards, creates a complex hierarchy of logical objects for path management that must be maintained across an entire network for proper operation and communication. The ITU-T Y.1731 standard uses Ethernet OAM for an analogous set of concepts. In order to simplify the discussion within this document and the expressions of the scope of inventive concepts, the term CFM is intended to cover both the relevant IEEE and ITU concepts. As shown in FIG. 1, the basic CFM objects include Maintenance Point (MP) 104, Maintenance Association (MA) 108, and Maintenance Domain (MD) 112. Note that the Maintenance Point 104 is associated with a logical port 116. As noted above, a logical port may be known as a UNI or NNI (User Network Interface or Network Network Interface). The Maintenance Association 108 is associated with the EVC (Ethernet Virtual Circuit) 120. A logical port 116 will be associated with a physical port 124. An EVC may be associated with one or more VLANs 128 The various concepts are introduced in more detail below.

Maintenance Domain (MD).

A MD 112 is identified by a level (between 0 and 7) that a set of CFM systems will communicate on. The level is designed to provide a hierarchy of network domains with Service Providers using the lowest levels and terminal customers using the highest levels. According to standards, CFM traffic at a specific level may not cross into a higher level, meaning Customer networks should never see Service Provider CFM traffic. A simplified representation of Maintenance Domains is shown in FIG. 2. A series of five networks are shown in FIG. 2. Moving from left to right there is customer network 204, provider network 208, operator network 212, provider network 216, and customer network 220. The operator MD level 280 runs between interface 258 at the edge of provider network 208 to interface 262 at the edge of provider network 216. The provider MD level runs from interface 254 at the edge of customer network 204 to interface 266 at the edge of customer network 220. The customer MD level extends all the way across the networks to include both the customer network 204 and the customer network 220.

Maintenance Point (MP).

The MP 104 identifies a logical port 116 that the CFM system will monitor. One of skill in the art will recognize that a single physical port 124 could serve as more than one logical port 116. The MP 104 must have a globally unique tag and depending on the MPs function (end-point, intermediate-point, or half-function) must also be pointed in the proper direction of the CFM network. Maintenance End Points (MEPs) and Maintenance Intermediate Points (MIPs) are both examples of MPs. The concepts discussed below primarily focuses on the configuration and maintenance of MEPs.

One of skill in the art will recognize that an instance of OAM may support multiple MEPs. For example, an individual device that supports multiple instances of an Ethernet Virtual Circuit (EVC) or Component EVC (CEVC) may also have a separate MEP for each EVC. Likewise, a single EVC that supports more than one MD level, or more than one MA may also have more than one MEP.

Maintenance Association (MA).

The MA 108 identifies a collection of MEPs that communicate via CFM. These MEPs may operate on a specific EVC 120. A given EVC may have zero, one, or more VLANs 128 (Virtual Local Area Network) operating on the EVC. The MA also provides a name for a set of MEPs that must be configured the same on all CFM nodes communicating in this MA. A simplified representation of Maintenance Association is shown in FIG. 3. In FIG. 3, a provider network 300 is connected to customer edge 354, customer edge 358, and customer edge 362. A first MA is associated with VLAN1 304 and a second MA is associated with VLAN2 308.

Thus, the Maintenance Association defines a set of MEPs all of which are configured with the same Maintenance Association Identifier (MAID) and MD Level (0 to 7). Each MEP within a Maintenance Association has a complete list of all MEP IDs within that Maintenance Association.

In addition to the basic objectives that allow a CFM enabled device to communicate with others, each MEP must also be configured with knowledge of all other MEPs that the CFM enabled device expects to exchange OAM traffic with. These objects are sometimes referred to as remote-MEPs (R-MEPs).

Continuity Check Protocol.

Continuity Check Message (CC message or CCM) is a way to detect connectivity failures. When enabled under Ethernet Continuity Check Function (ETH-CC), the use of CC messages is part of a proactive monitoring for faults including the loss of continuity between any pair of MEPs.

A CC message is a multicast message confined to a MD. The messages are unidirectional and do not solicit a response. Each MEP transmits a periodic multicast CC message towards the other MEPs. The CC message is sometimes referred to as a "heart beat" message.

External Interfaces (EIs).

Ethernet OAM standards often identify three types of Deployment Roles—Customers, Operators, and Service Providers. Logical port interfaces between administrative entities are often referred to as External Interfaces (EIs). Two common types of EIs are User-to-Network Interfaces (UNIs) and Network-to-Network Interfaces (NNIs).

FIG. 4 has a simplified drawing of a series of External Interfaces between the operator domain 404 and the provider domain 434 and again between the provider domain 434 and the customer domain 464. MEPs are often deployed at interfaces between administrative entities so that one entity can monitor the service it provides to another entity 'end-to-end', while the higher entity can monitor the service that it is buying. For example, between an operator edge 408 and a provider edge 438 or between a provider edge 438 and a customer edge 468.

Creating and maintaining the object hierarchy manually for a few devices may not be difficult, however, this process does not scale well—as manual configuration is complex and error-prone. Thus, prior art solutions would benefit from a system that can automatically detect CFM networks and configure the objects required to become a part of the CFM infrastructure.

FIG. 5 provides a state diagram describes a prior art state machine used to create and join a CFM network and shows the complexity inherent in the distributed nature of the network configuration. Step 504 is start. Step 508 is create MD (may be done by end user).

Step 512 is create MA (may be done by end user). Step 512 is create MP (may be done by end user). Step 520 is the Send/Receive Continuity Check messages. The receipt of a new Continuity Check message triggers Step 524. Step 524 is to Create RMEP also known as remote-MEPs or R-MEPs (may be done by end user). If the newly created RMEP is tested at node 528 and is a duplicate of a known RMEP, then there is an error 532 and remedial action may be required.

Creating and maintaining the object hierarchy manually for a few devices may not be difficult, however, this process does not scale well—as manual configuration is complex and error-prone. Thus, prior art solutions would benefit from a system that can automatically detect CFM networks and configure the objects required to become a part of the CFM infrastructure.

SUMMARY OF THE DISCLOSURE

In one of the many possible implementations of the teachings of the current disclosure, a self-terminating Domain Listener and Domain Manager could be implemented to join new nodes to an OAM network and a Peer listener and Peer Manager could be implemented to allow new nodes on a network to be automatically learned. The learning may be implemented by inspecting existing messages. Security precautions are likely necessary when controlling the entrance/removal of members in an MA and are also covered within this disclosure.

One possible implementation of the teachings of the current disclosure is to create a device used in a communication network to convey Ethernet frames from a source to a destination, the device having at least two logical communication ports; the device supporting Connectivity Fault Management "CFM" including:
  monitoring selected Maintenance End Points "MEP";
  using CFM Maintenance Domain "MD" levels; and
  using CFM Maintenance Association ID "MAID" names;
  wherein the device has:
  a Domain Listener that determines a list of active OAM domains for a particular EVC by inspecting at least some Ethernet OAM frames to obtain information including:
  CFM MD level;
  CFM MAID name;
  CFM CC interval; and
  OAM directionality for an inspected frame for a particular CFM MD level and CFM MAID name;
  a Domain Manager that turns the list of active OAM domains for a particular EVC into a local configuration;
  a Peer Listener that inspects at least some Ethernet OAM frames to obtain information on each remote MEP including:
  MAC address; and
  MEP ID; and
  a Peer Manager that adds a remote MEP to a remote MEP list for a relevant MEP for that device.

The device may be configured to limit local configurations to a particular range of at least one MD level such that a device may be concerned with MD levels of interest to a customer, vendor, or infrastructure provider.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

DETAILED DESCRIPTION

Figure 1:
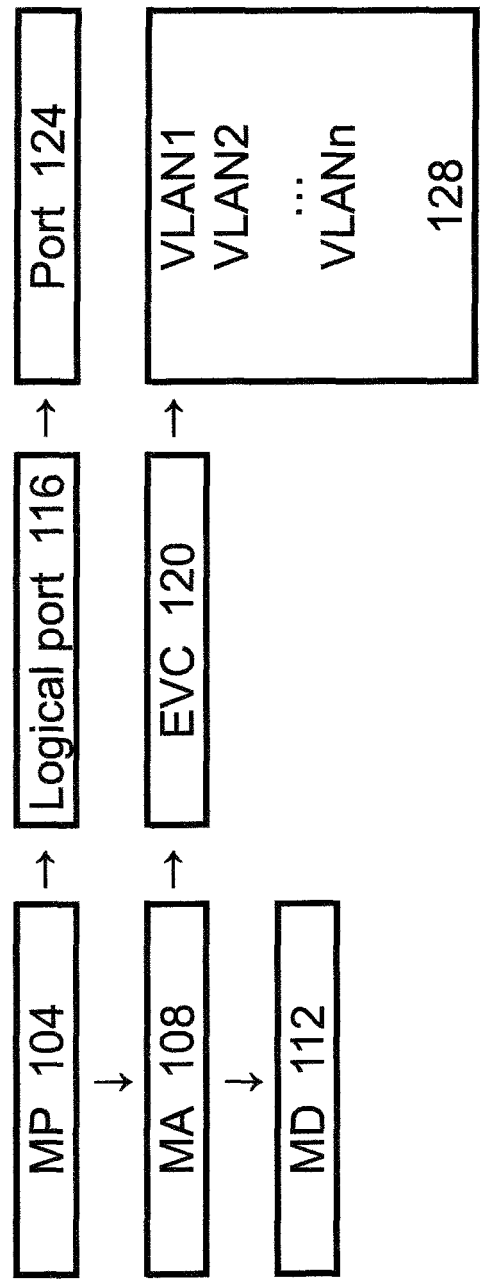
FIG. 1 provides a simplified overview of the relationship of basic OAM concepts known in the Prior Art.
Figure 2:
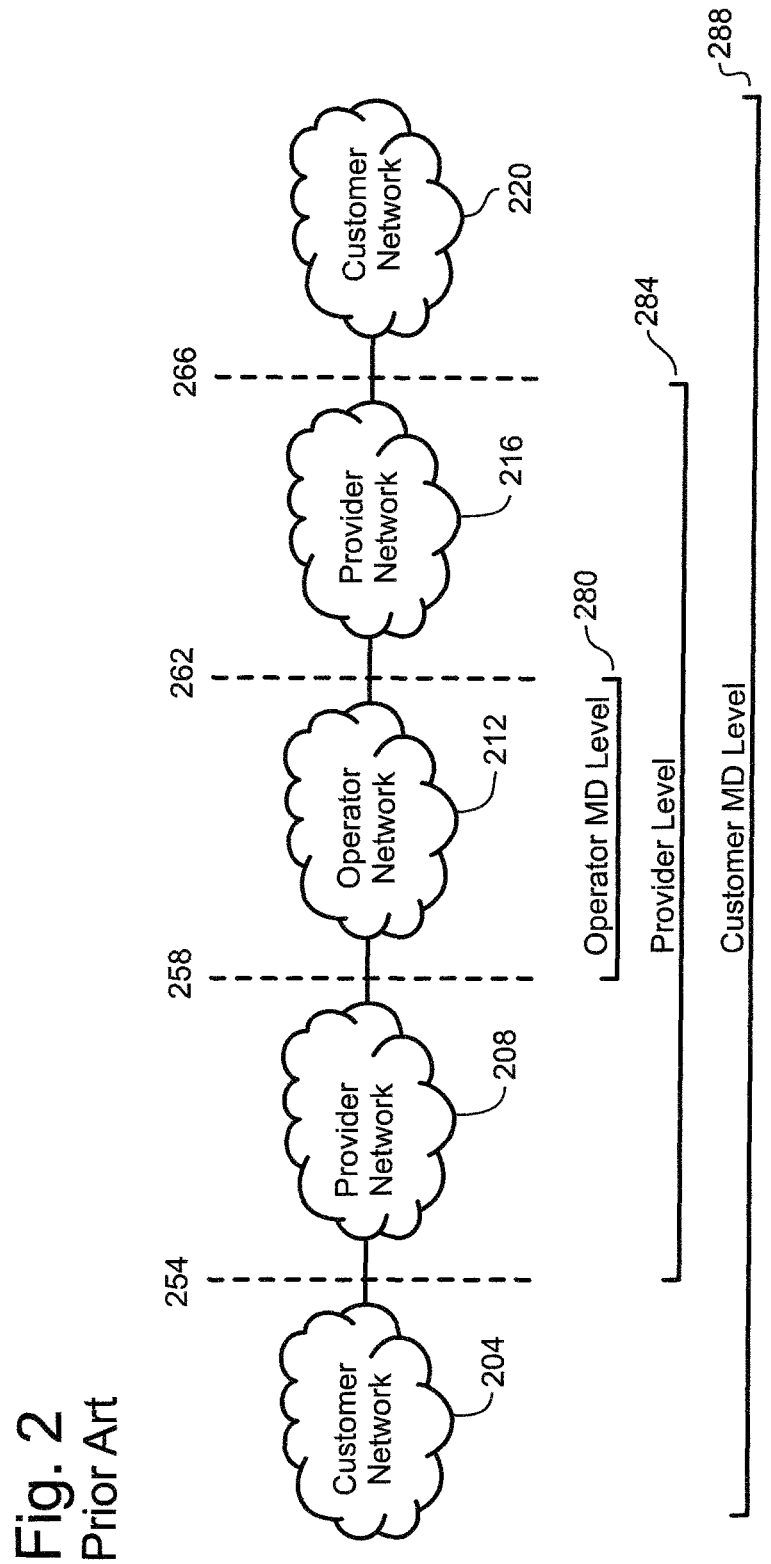
FIG. 2 is a simplified representation of Maintenance Domains.
Figure 3:
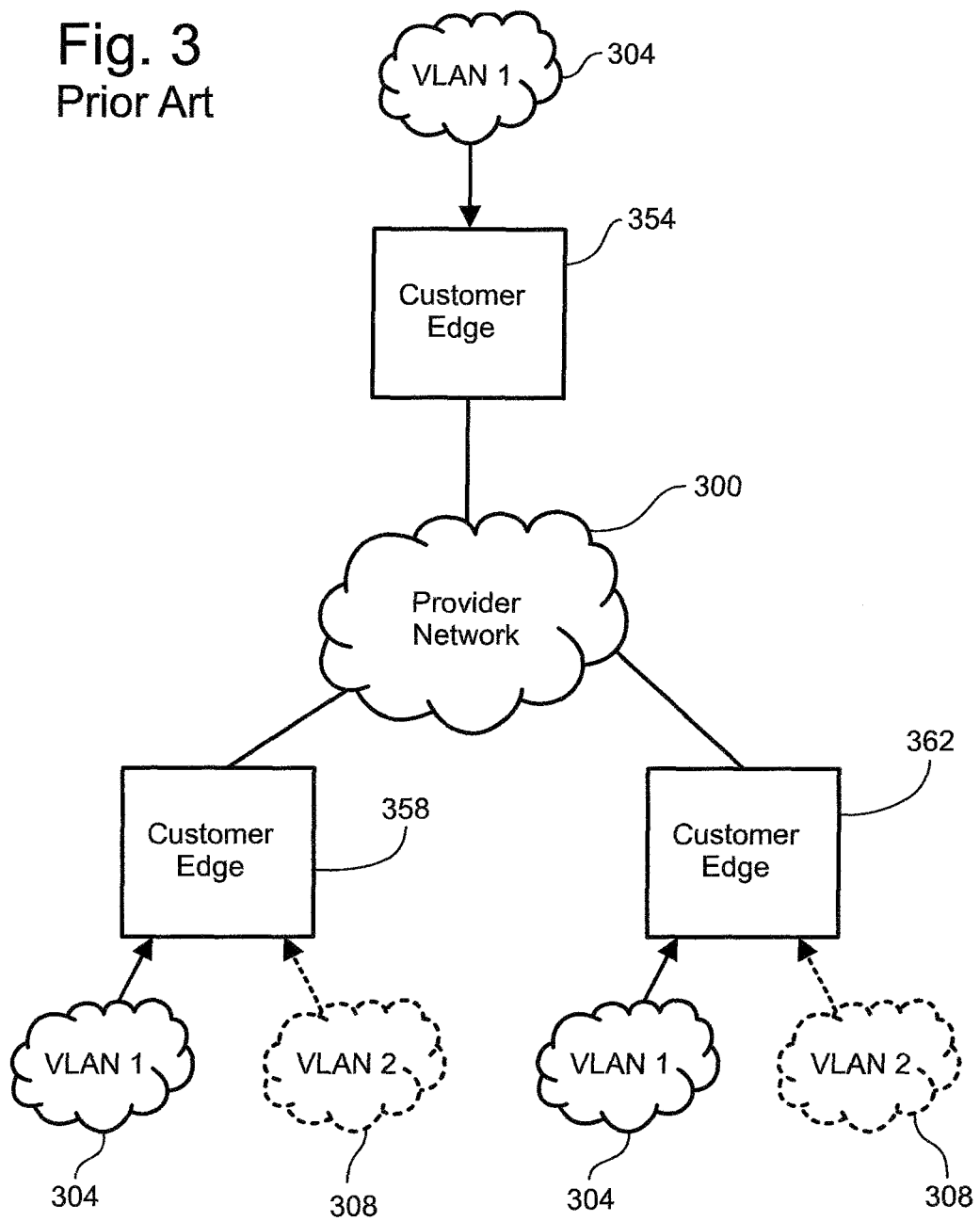
FIG. 3 is a simplified representation of Maintenance Association.
Figure 4:
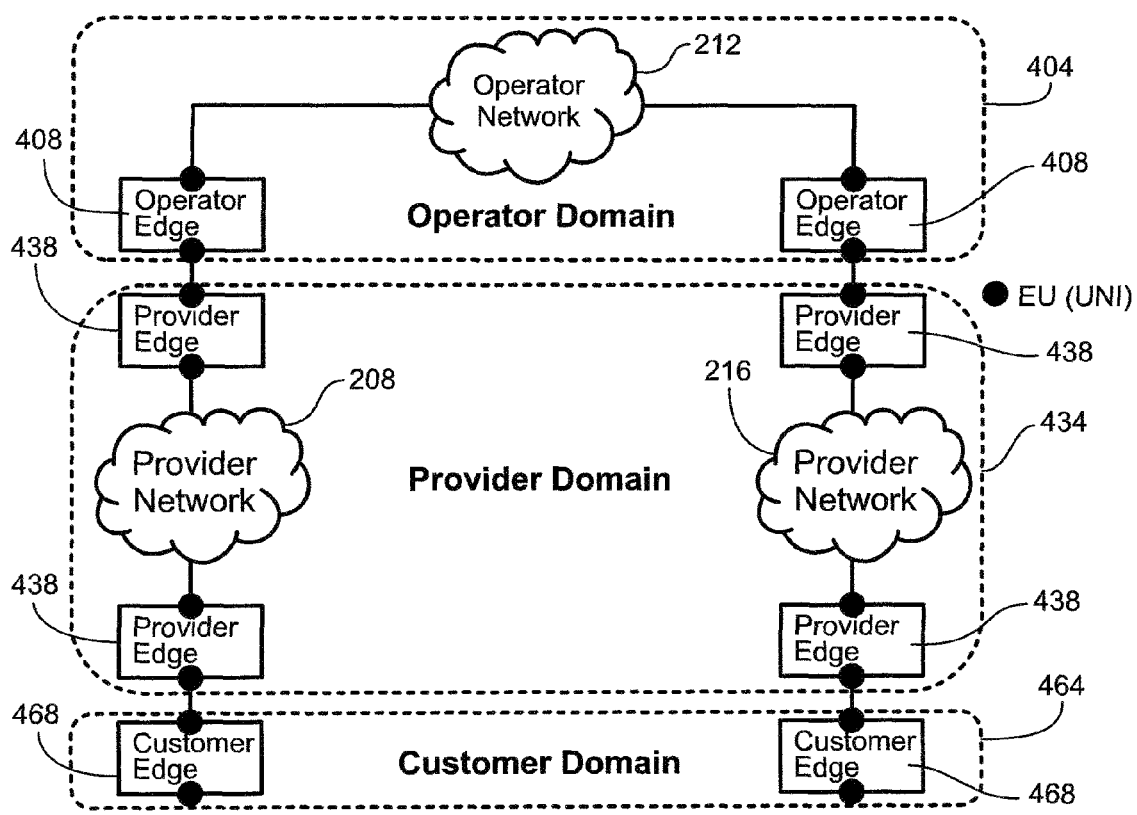
FIG. 4 has a simplified drawing of a series of External Interfaces between the operator domain and the provider domain and again between the provider domain and the customer domain.
Figure 5:
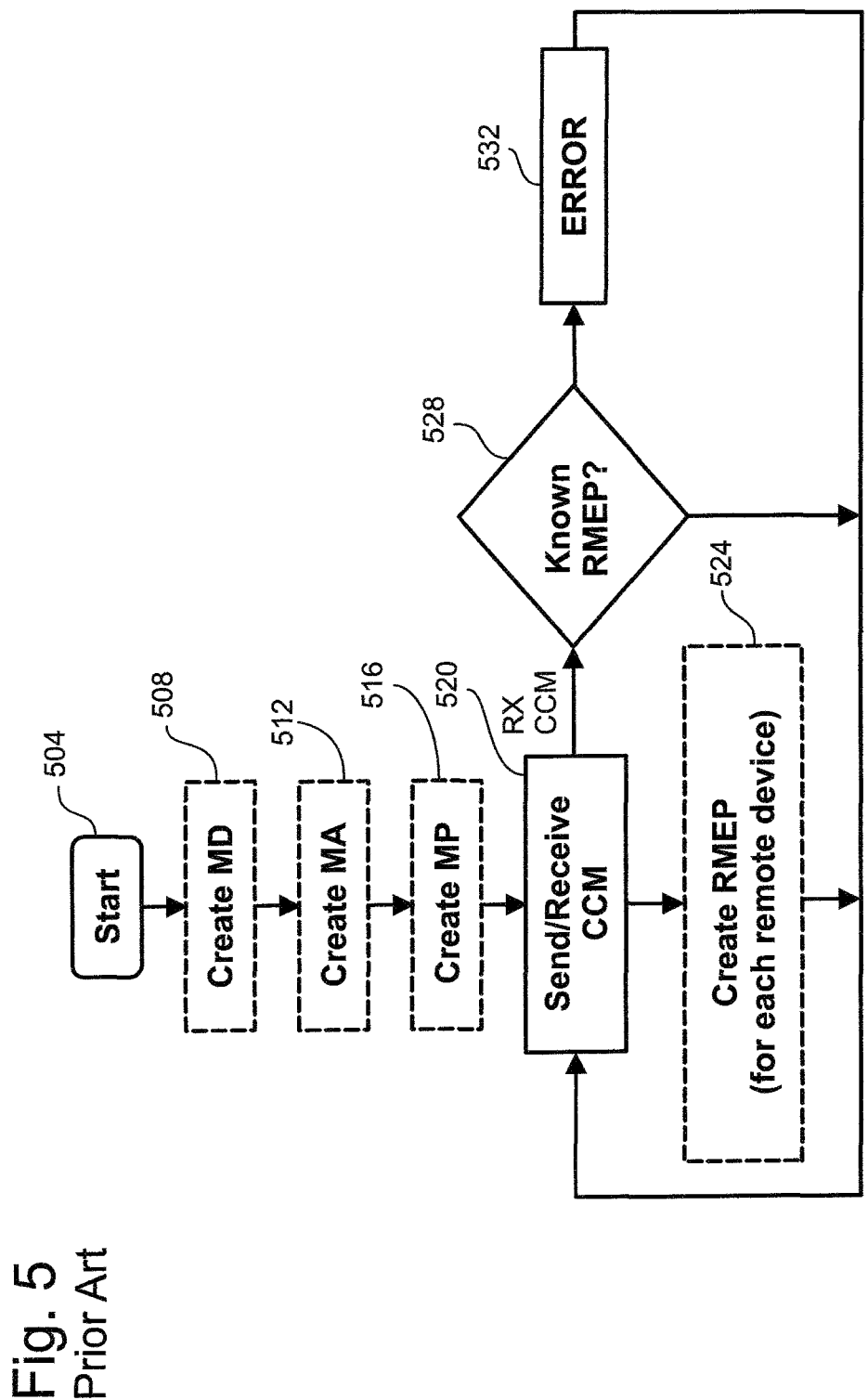
FIG. 5 provides a state diagram describes a prior art state machine used to create and join a CFM network and shows the complexity inherent in the distributed nature of the network configuration.

One solution is comprised of the following components:
Domain Listeners,
Domain Managers,
Peer Listeners,
MP Managers,
Peer Managers, and
a Security component.

These components are descriptive in nature—and are provided in order to help disclose the methods and procedures of the current disclosure. As the methods and procedures may be adapted to specific situations, the teachings of the present disclosure should not be limited to instances where all of the components exist exactly as described in this disclosure. The teachings of this disclosure may be incorporated in full, or specific subsets may be implemented to provide useful but limited functionality.

Overview of Domain Listeners and Domain Managers.

The Listeners determine what CFM networks are available and what peer CFM entities may exist. The Listeners inspect on Ethernet OAM traffic received to create a local database of learned OAM information. That information may be used by one or more optional Manager components to make local configuration decisions, or the information may just be presented to the user who can then make simple configuration selections from the list of learned information. A security component is included to provide optional validation of learned data and protect the protocol from learning the wrong information.

A primary purpose of Ethernet OAM is to determine connectivity faults—a condition that occurs when two maintenance end-points lose bidirectional connectivity. To this end, CFM maintenance end-points periodically generate and transmit Continuity Check (CC) messages in a multicast domain that notifies other CFM maintenance points that the end-point is still alive. These CC messages, coupled with the knowledge of the port and direction the CC messages were received, provide much of the information required for generating the required CFM object infrastructure.

Domain Listeners.

A Domain Listener inspects on a particular EVC to identify Ethernet OAM frames. There may be many Domain Listener functions on each platform (one for each EVC, for example). Ethernet OAM frames can be identified by inspecting the frame header, and the examined fields may include Ethertype, destination MAC address, or other header fields for OAM frame identification. An exemplary implementation can use the destination MAC address and Ethertype(s) for identifying an Ethernet OAM frame, though other fields can also apply under some circumstances. A Domain Listener may limit inspecting to only CC messages or the Domain Listener may inspect other types of OAM frames as well. A Domain Listener may listen on all ports on which an EVC is enabled, or the Domain Listener may be limited to a subset of the ports in the EVC. In an exemplary implementation, the Domain Listener inspects only on CC messages and only on a subset of ports (for example, the External Interfaces).

A Domain Listener determines the set of active OAM domains on the inspected EVC, where the set of active OAM domains includes at least the following:
CFM MD level: which can be determined from the CFM Header in the CC payload
CFM MEG/MA ID/Name: determined from the CFM CC Header in the CC payload
CFM CC Interval: determined from the flags in the CFM Header in the CC payload.

For each active OAM domain, a Domain Listener also identifies the set of active ports for that domain on this device. This list will be the list of ports on which the Domain Listener identified a received Ethernet OAM frame. At this point, the Domain Listener has successfully identified a set of potential OAM domains for the EVC on which it is listening, as well as the set of ports on which that OAM domain is known to be active and the OAM directionality of the frame Those skilled in the art will recognize that OAM directionality is the UP/DOWN direction relative to the port as defined by the IEEE and ITU standards.

A Domain Listener may be an on-going or terminating function. Allowing an ongoing detection of domains permits a system to react dynamically over time. Terminating a Domain Listener function ensures that the learning operation is performed in a relatively controlled fashion (for example, only on port activation or recover). Both options can be useful.

Figure 6:
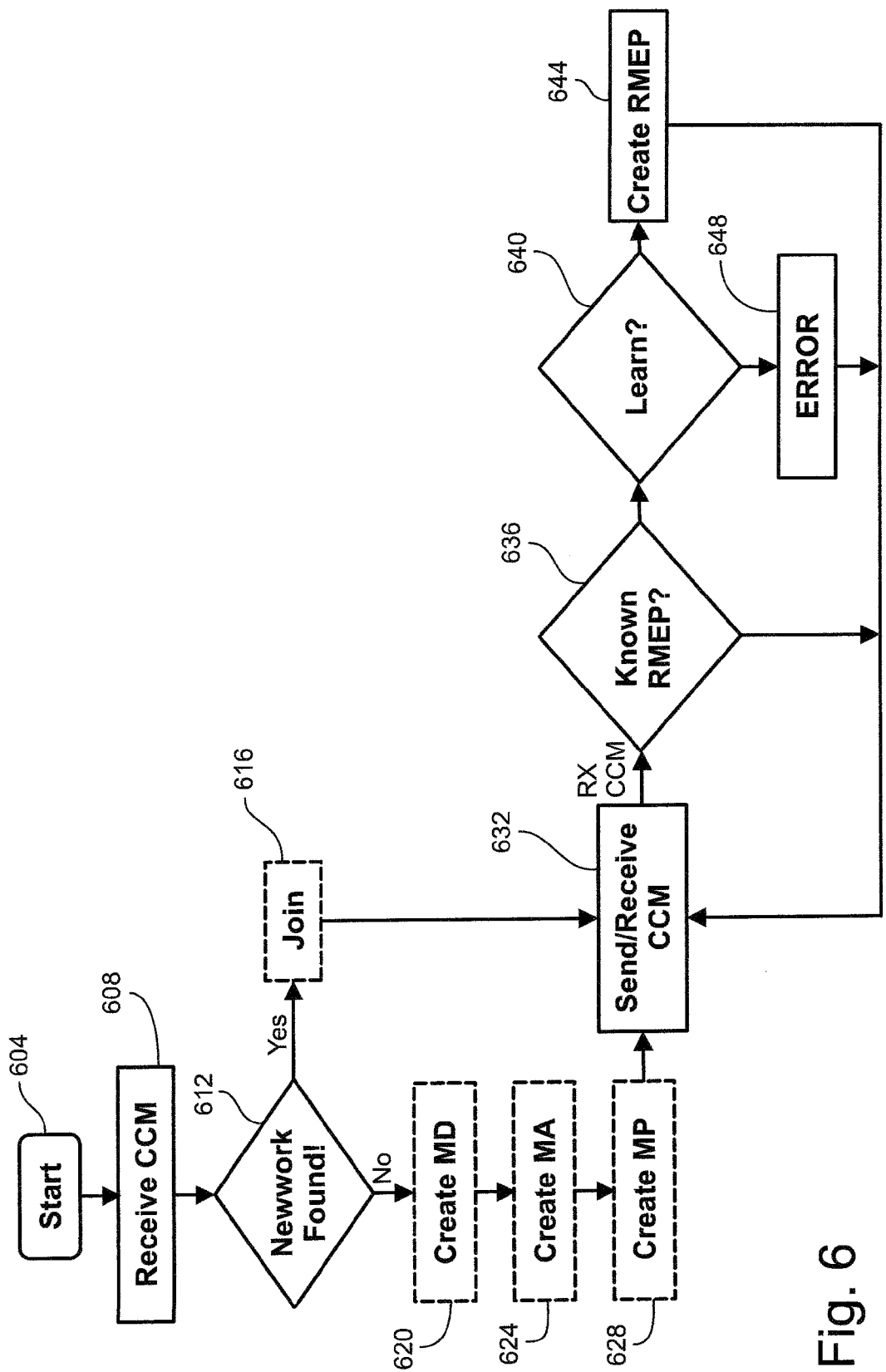
FIG. 6 is a state diagram describing one way that the proposed learning mechanisms can be integrated into the configuration process.

FIG. 6 is a state diagram describing one way that the proposed learning mechanisms can be integrated into the configuration process.

Step 604 is start. Step 608 is Receive CCM. Decision Node 612 branches based on whether a network has been found. If yes, then Step 616 to join network, perhaps using user input. If no, then step 620 to create MD, perhaps using user input, and step 624 create MA perhaps using user input, and step 628 create MP, perhaps using user input.

Step 632 is to send and receive CCM. For a received CCM, node 636 branches based on whether the RMEP is known. If NO, then proceed to node 640 with a branch based upon Learn RMEP. If yes, then step 644—create RMEP. If no, then there is an error 648. This process continues as additional CC messages are sent and received.

As can be seen, after the network is initially created on one node, very little user interaction is required. While the description of FIG. 6 notes that the steps Join, Create MD, Create MA, and Create MP may be performed using user input, one of skill in the art will recognize that for an automated system, these steps may be fully automated or they may be automated with an option for the user to confirm that the proposed action should be performed.

Domain Managers.

A Domain Manager for a particular EVC acts on information learned by a Domain Listener. One of skill in the art will recognize that instead of having one Domain Manager EVC, a single Domain Manager could be responsible for more than one EVC. Same for Domain Listener. In a particular implementation, the Domain Manager may act immediately on new information learned by a Domain Listener. However, this is not required. The Domain Manager may allow the Domain Listener to run for a while, run to completion (if it is a terminal process), or it may act immediately upon the information learned.

Once information has been learned, there are many potential use cases of that information. The Domain Manager is responsible for turning that learned information into local configuration by adding the learned information into its local configuration database as described below.

The configuration may be permanently stored (so that it is available after a reboot), or left in dynamic storage so that it would have to be learned again after the device restarts.

In perhaps the simplest application, the user is simply presented a list of all learned OAM domains and can manually select which domains to turn into local configuration.

The local configuration is the minimal set of information required to join a Maintenance Domain. Specifically, this requires storage of at least the MD level, MA ID, unique MEP ID, port and direction of operation, and CC interval for each MEP to be created. The actual information stored will depend largely on the implementation of CFM and limiting us to that information would be overly restrictive. The required operations to create and store a local configuration will vary by device and method of storage as well. The basic actions would be for the MP Manager to write the required configuration data into a storage medium allowing the data to be retrieved again later.

Every learned domain may be automatically configured in the local device, where configuring means that the domain information is stored in the local database and accessible for other functions (for example, available in the MIBs (Management Information Base), can be viewed from the CLI (Command-Line Interface, etc.). Note that the overhead of turning learned information into configuration is relatively low—there are no processing functions associated with the domain information by itself until MPs are created.

When a device has EI ports, it may selectively instantiate only those learned OAM domains that are on EVCs that cross those EIs. OAM domains that do not cross EI's could be considered less important to monitor.

When a device has knowledge of its Deployment Role (Customers, Operators, or Service Providers), the device may selectively instantiate only those learned OAM domains whose levels fall within that Deployment Role category. Those of skill in the art will recognize that in many instances the device will not have knowledge of its deployment role and thus will not selectively instantiate only those learned OAM domains that fall with that Deployment Role category.

The Domain Manager may also serve an intrinsic error detection capability. If the Domain Manager detects conflicting OAM messages (for example, two different MAIDs), the Doman Manager can alert the user of this conflict. In such cases, presenting the information from the Peer Listener (to identify the remote devices sourcing conflicting information) along with the conflicting data from the Domain Listener is beneficial to the user.

In a particular implementation, the Domain Manager knows which interfaces are UNI interfaces and knows its Deployment Role (for example, whether it is serving as an operator demarcation device, a service provider demarcation device, or both), and the Domain Manager instantiates local configuration for the OAM domains at the level(s) of its Deployment Role that cross its UNI interface(s).

Peer Listeners.

A Peer Listener further refines the dynamically learned OAM information by identifying the remote MEPs that are active on a particular OAM domain. As discussed earlier, when a particular MEP is configured/added to a network, each peer MEP must be configured to know about the existence of that particular MEP.

For each known (learned or configured) OAM domain on its EVC, a Peer Listener component can identify the remote MEPs that are active, and associate them with an active port of that domain. The Peer Listener for an EVC identifies active MEPs by inspecting Ethernet OAM frames on its EVC. As with Domain Listeners, a Peer Listener may inspect only certain types of OAM frames (CC messages, for example), or it may inspect all types of Ethernet OAM frames.

Each remote MEP is identified by at least its
MAC address
MEP ID
Interface or MEP on which it was learned As with Domain Listeners, Peer Listeners may run ongoing or may terminate. Note that Peer Listeners may also operate independently of Domain Listeners. Even when a domain is manually configured rather than learned, it can be useful to dynamically learn the set of peer devices.

MP Managers.

For a particular EVC, the Domain Listener maintains a list of learned OAM domains and the ports on which they were active, and the Peer Listener expands that information by identifying the individual remote MEPs that are communicating. The MP Manager is responsible for acting on that information by creating local Maintenance Points on those learned OAM domains.

In an exemplary application, the MP Manager waits for a period of time before acting on information learned by the Domain Listener. However, this delay is not a required part of this application. The MP Manager may allow the Domain Listener to run for a while, run to completion (if it is a terminal process), or it may act immediately upon the information learned. Waiting for a while, helps ensure that the set of ports within a particular domain are properly identified. As an exemplary method, if the Domain Listener is inspecting primarily on CC messages, the MP Manager could wait for a time larger than the maximum CC timer so that the Domain Listener has had the opportunity to inspect on OAM frames from every potential active remote MEP, and therefore has more likely identified every local port active in the learned OAM domain.

The MP Manager then acts on the Domain Listener information in an applicable manner, turning the learned data into local configuration, creating MIPs and MEPs based on locally defined methods and algorithms.

In perhaps the simplest application, the MP Manager can simply present the list of all potential OAM domains and all associated ports to the user, and the user can manually select on which ports to add MPs for which OAM domains, and with which remote MEPs.

When a device has knowledge of its Deployment Role and EI ports, it may selectively instantiate 'up' MEPs on the boundary EI ports for learned OAM domains whose levels fall within that Deployment Role category. For example, if the device knows that its Deployment Role is Operator, then the device can create 'up' MEPs on every UNI port for all domains that are within the Operator levels (0, 1, & 2). It is a common configuration to create UP MEPs on UNI ports for active EVCs to provide end-to-end service visibility.

When a device has knowledge of its Deployment Role and External Interfaces, it may instantiate MIPs on every non-EI for every learned OAM domain that falls within its Deployment Role levels. The device may further limit MIP creation only on EVCs that are not part of any EI ports. This would in essence automatically instantiate MIPs for every EVC that does not cross an EI, which is seen as a common desired configuration.

A device may instantiate a 'down MEP' on any port on which lowest level (level 0) OAM traffic is received as the lowest level is often used for the monitoring of individual links.

When a device is tunneling an EVC on a particular interface (e.g. encapsulating traffic with a second EVC tag via a QinQ/802.1ad, using VPLS over MPLS networks, using Provider Backbone Bridging/PBB), it may create instantiate a MP on the tunneling port. For example, it may create a 'down' MEP automatically for each tunneled EVC as this interface is the last that has visibility to OAM traffic to this EVC (rather than to this tunnel) and is thus a likely place where maintenance visibility will be required.

Peer Managers.

For a particular EVC, the Peer Listener maintains remote MEP identifiers for each distinct MEP for each of those domains. The Peer Manager is responsible for acting on that remote MEP information to adjust the remote MEP list for each locally instantiated MEP. As discussed earlier, each MEP is supposed to be configured with a list of the MEPs (by MEP ID) with which it is expecting communications.

A Peer Manager can operate independently of the other Managers and the Domain Listener—it only requires the Peer Listener as a prerequisite. A Peer Manager can add value whether the other components of this application are implemented or not.

In an exemplary application, the Peer Manager acts whenever a new MEP is detected on an OAM domain that has been configured locally (either manually or automatically) on which there is a local MEP. However, immediate action is not a required part of this application. The Peer Manager may allow the Peer Listener to run for a while, run to completion (if it is a terminal process), or it may act immediately upon the information learned.

The Peer Manager acts on the Peer Listener information in an applicable manner, turning the learned data into local configuration, adding learned MEP IDs to the remote MEP list for locally configured MEPs based on local algorithms.

In perhaps the simplest application, the Peer Manager can simply present the list of all potential remote MEPs to the user, and the user can manually select which if any of the remote MEPs to add to the remote MEP list of the local MEP(s).

In a particular implementation, the Peer Manager can automatically add all learned remote MEPs within a particular level to the remote MEP list of the local MEP on that level.

The Peer Manager could require pre-authorization for automatically adding remote MEPs. For example, the user might have to manually enable "automatic remote MEP updates" either globally or on the EVC for automatic updates to occur. This could help prevent configuration changes from occurring unintentionally, or in EVCs which are already known to be correct.

Security.

Because the processes of this application automatically update local configuration (and behavior) based on monitored network activity, it can be useful to include a security mechanism so that information can be validated before it is believed (and acted upon). Thus, the device does not rely upon information in OAM frames that do not have a digital signature value that is an expected digital signature. To say "an expected digital signature" does not necessarily mean that there is only one valid signature but it does imply that characteristics of the digital signature are known or predictable based upon any known security scheme including those that use shared secrets.

One exemplary implementation of a security mechanism is to permit digital signatures on OAM frames. In particular, if the inspecting mechanisms are based on CC messages, digitally signing CC messages can ensure only 'valid' CC frames are considered.

A security hash algorithm (such as MD5, SHA, SHA2, etc.) can be used over a defined portion (all or a subset) of the OAM frame along with a shared secret to create the digital signature.

A digital signature on an OAM frame can be accomplished by adding a specific TLV (type-length-value) attribute on the OAM frames (or just some of the OAM frames such as the CC messages). The TLV 'type' field could be a type specifically for this (or any) digital signature, or it could be a vendor specific TLV with a digital signature subtype.

The digital signature TLV could either use a fixed/known security hash algorithm, or could include a security sub-type that identifies the specific algorithm used (MD5, SHA, etc.).

The digital signature TLV could also include a timestamp (within the TLV or in another TLV). Including a timestamp in the hashed part of the frame can help protect against replay attacks and better guarantee uniqueness of the security hash.

In an exemplary implementation, the digital signature TLV might be calculated over the entire OAM frame (including the digital signature TLV type/length), use a vendor specific TLV format with a digital signature subtype, include a security subtype to identify the hashing algorithm, and include a timestamp to protect against replay attacks.

As an example, within an Operator domain, all devices could be configured with a shared secret, which can then be used to 'sign' all (or some) OAM frames. The digital signatures can be verified before a Domain or Peer Listener accepts the information.

Alternatives and Variations.

Gathering only a Subset of Parameters.

While the discussion above broke activities into activities for separate listeners or managers, one of skill in the art will recognize that one entity could perform activities allocated to one or more of the following actors—Domain Listener, Domain Manager, Peer Listener, Peer Manager, MP Manager, and Security function.

While it may be efficient to obtain
CFM MD level;
CFM MAID name;
CFM CC interval; and
the OAM directionality for a reviewed frame for a particular MD level and MAID,
one of skill in the art will recognize that in some situations one or more of these four parameters may be known and can be provided to the device through a user interface. Likewise, given that the CC interval is one of small number of choices, the CC interval could be guessed and this guess tested. If the first guess is wrong, then a second value for CC interval could be assumed and tested. This process may be continued until the CC interval is ascertained.

Thus, one could use the teachings of the present disclosure to ascertain through the Domain Listener, a subset of parameters rather than the four listed above. Thus, in a more general form, the Domain Listener may obtain at least one CFM parameter for an active OAM domain.

Configuring a MIP Rather than a MEP.

While the focus of the discussion above has been on configuring a MEP, one could apply selective teachings of the present disclosure to save time and reduce errors in the process of configuring a MIP. As noted above, a MEP is a Maintenance End Point and a MIP is a Maintenance Intermediate Point. In certain cases an individual device could have a MEP on one side and a MIP on the other side.

Note while not required by the IEEE or ITU standard, some MIPs may be inspecting CC messages to discern which MEPs are sending messages to a particular port for the device. This information can be used when forwarding information for Link Trace Messages.

Given that MIPs are normally passive objects and do not generate CC messages, a system that uses CC messages for discovery of devices will not notice remote MIPs. Those of skill in the art will recognize that other tools could be used to discern the identity of network MIPs.

Ethernet OAM Protocol Enhancements.

The process of 'inspecting' Ethernet OAM frames could be difficult depending upon the implementation. This application mentions inspecting on CC frames, which in many implementations could be easily monitored. However, in some implementations and applications inspecting CC messages could be difficult. The difficulties could arise from an implementation with a very high frequency of CC messages (such as one CC message broadcast from every MEP every 3 milliseconds), or one implemented in a fixed hardware component, or some possibly from some other source of difficulty.

Similarly, adding a security component to CC messages would, in some implementations, prove difficult for the same reasons—the overhead per message would be higher, and changing existing hardware-based implementations can be difficult.

To address this potential difficulty, a different type of OAM message could be used, as long as it had similar information to what could be gleaned from the CC messages. For example, a new OAM message type could be added specifically to address communicating configuration. For now, we refer to this potential new OAM message type as a JOIN message.

JOIN Message.

The JOIN message could be sent periodically, similar to a CC message, but at a much lower frequency (for example, once every 5 seconds). It could contain much of the same information as found in a CC message and potentially more. The Domain and Peer listeners could inspect only on that OAM JOIN message type, resulting in much less overhead and complexity than inspecting on the more frequent CC messages. This inclusion of a new message type would also increase security and efficiency as only the entrance (and exit) into the MA would be security controlled by this new message type, and other CFM operations would not require any changes.

This JOIN message would have to advertise the local MEPs configuration parameters (much like inspecting on a CC message would), but a JOIN message could also advertise the local MEPs peer database. Advertising the local peer database would allow MEPs to determine if a MA is not synchronized (that is to say that not every MEP knows about every other MEP in the MA). Thus, in sense, each MEP could advertise not only "who I am", but "here's what I know".

Note that a JOIN message could be implemented with a new message type/opcode, or could be implemented by an existing message type/opcode by adding new information to the existing information, thus changing or expanding its semantics.

LEAVE Message.

The discussions in the application thus far focus on adding local configuration based on dynamic protocol inspecting. Although the vast majority of configuration changes result from adding new information, there are also operations where information should be removed from the local configuration.

This cannot be done by inspecting CC messages as a fault would be indistinguishable from an item administratively leaving. However, similar to a JOIN message, a LEAVE message could be added that informs other MEPs about the administrative removal of an existing MEP. When a LEAVE from MEP X was detected, the receiving MEP would ensure that MEP X was not listed as a remote MEP for any local MEPs. This would allow automation of detecting/adding new MEPs into an MA, as well as removal of a MEP from a MA in a manner that is differentiated from a fault detection.

General Comments.

It will be understood, and is appreciated by persons skilled in the art, that one or more processes, sub-processes, or process steps described above may be performed by a combination of hardware and software. The software may reside in software memory. The software in memory may include an ordered listing of executable instructions for implementing logical functions (that is, "logic" that may be implemented either in digital form such as digital circuitry or source code or in analog form such as analog circuitry), and may selectively be embodied in any tangible computer-readable medium (sometimes expressed as a non-transitory computer readable medium) for use by or in connection with an instruction execution system, apparatus, or device, such as a computer-based system, processor-containing system, or other system that may selectively fetch the instructions from the instruction execution system, apparatus, or device and execute the instructions.

In the context of this disclosure, a "computer-readable medium" is any means that may contain, store, communicate, propagate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or medium. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic), and a portable compact disc read-only memory "CDROM" (optical) or similar discs (e.g., DVDs and Rewritable CDs). Note that the computer-readable medium may even be paper or another suitable medium upon which the program is printed, as the program can be electronically captured, via, for instance, optical scanning or reading of the paper or other medium, then compiled, interpreted or otherwise processed in a suitable manner if necessary, and then stored in the memory.

Distribution of Software.

It is also important to note that although the present disclosure has been described in the context of a fully functional computer system, those skilled in the art will appreciate that the mechanisms of the present disclosure are capable of being distributed as a program product or a portion of a suite of programs. This distribution may be done in a variety of forms. The inventiveness of the present disclosure is present in a set of computer instructions adapted to implement some or all of the innovations described above regardless of how this set of instructions is conveyed. A set of computer instructions is a set of instructions adapted for use by a computer in achieving some or all of the advantages set forth above and is distinguishable from a paper such as this disclosure that describes the attributes of an implementation without providing anything that can be processed by computer components available in early 2012 to ultimately be executed by a computer.

One of skill in the art will recognized that the set of computer instructions may be stored on one or more mass storage memory devices that are accessible by a particular computer system to implement some or all of the innovations described above. The set of computer instructions may be conveyed in one of many types of signal bearing media. Signal bearing media carrying instructions to be executed by one or more computer programming languages may be conveyed in different formats including without limitation program instructions in high level programming languages or in machine code. The signal bearing media may be located on traditional articles of manufacture that are any one of a variety of recordable type media such as floppy disks or compact discs (including write once and re-recordable media). In this instance the recordable type media receives a written set of computer instructions which can subsequently be read by an input device. The recordable type media may then be shipped from one place to another such as shipped to a customer and then the customer may access the computer instructions written into the recordable type media. Thus, an article of manufacture may be made that is a program product comprising a non-transitory computer readable medium having embodied therein a computer program for storing data, the program product comprising: machine readable logic for installing computer program instructions for configuring a device used in a communication network in keeping with the teachings of more or more portions of this document.

A separate category of signal bearing media not currently considered a traditional article of manufacture under the United States patent laws is a paper printout carrying the sequence of computer instructions in at least one computer software language. One of skill in the art will recognized that an appropriate scanner may read paper through such routes as bar code readers, optical character recognition (OCR) of text, or via detection of holes in paper cards or paper tape.

The signal bearing media may be any of the many transmission type media such as analog or digital communications links as the software may be conveyed to a purchaser without the shipment of permanent tangible media but through a transitory propagating signal such as a series of internet protocol packets.

To the extent that the relevant patent laws allow issuance of claims covering each of these three types of signal bearing media, (recordable media, paper printout, and transmission type media), then it is the intent to include such signal bearing media within the scope of relevant claims.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

The legal limitations to the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A device used in a communication network to convey Ethernet frames from a source to a destination, the device having at least two logical communication ports; the device supporting Connectivity Fault Management "CFM" including these aspects of CFM:
    monitoring selected Maintenance End Points "MEP";
    using CFM Maintenance Domain "MD" levels; and
    using CFM Maintenance Association ID "MAID" names;
    wherein the improvement comprises:
        a Domain Listener that determines a list of active OAM domains for a particular EVC by inspecting at least some Ethernet OAM frames to obtain information including:
        CFM MD level;
        CFM MAID name;
        CFM CC interval; and
        OAM directionality for an inspected frame for a particular CFM MD level and CFM MAID name;
        a Domain Manager that turns the list of active OAM domains for a particular EVC into a local configuration;
        a Peer Manager that adds a remote MEP to a remote MEP list for a relevant MEP for that device; and
        a Peer Listener that inspects at least some Ethernet OAM frames to obtain information on each remote MEP including:
        MAC address; and
        MEP ID.

2. The device of claim 1 wherein one entity serves as Domain Listener and the Domain Manager.

3. The device of claim 1 wherein one entity serves as Peer Listener and Peer Manager.

4. The device of claim 1 wherein one entity serves as Domain Listener, Domain Manager, Peer Listener, and Peer Manager.

5. The device of claim 1 wherein one entity serves as Domain Listener and the Peer Listener.

6. The device of claim 1 wherein one entity serves as Domain Manager and the Peer Manager.

7. The device of claim 1 wherein the device supports CFM as implemented in IEEE 802.1ag.

8. The device of claim 1 wherein the device supports CFM as implemented in ITU-T Y.1731.

9. The device of claim 1 wherein the device is configured to limit local configurations to a particular range of at least one MD level such that a device may be concerned with MD levels of interest to a customer, vendor, or infrastructure provider.

10. The device of claim 1 wherein the device receives user input to select an OAM Domain from the list of active OAM domains before creating a local configuration.

11. The device of claim 1 wherein the device automatically selects an OAM Domain from the list of active OAM domains before creating a local configuration.

12. The device of claim 11 wherein the device automatically selects an OAM Domain to join based upon MD level.

13. The device of claim 1 wherein the device requires user input to approve the remote MEP before adding the remote MEP to the remote MEP list.

14. The device of claim 1 wherein the device automatically adds the remote MEP to the remote MEP list without user input.

15. The device of claim 1 wherein the Domain Listener is a terminating function.

16. The device of claim 1 wherein the Domain Listener is not a terminating function.

17. The device of claim 1 wherein the local configuration created by the Domain Manager is permanently stored so that the local configuration is available after the device is rebooted.

18. The device of claim 1 wherein the device inspects at least some Ethernet OAM frames but limits inspection to Ethernet OAM frames with an expected digital signature.

19. The device of claim 18 wherein the digital signature includes information based upon a timestamp to help protect against replay attacks.

20. The device of claim 1 wherein the device sends out at least some Ethernet OAM frames with a digital signature.

21. A device used in a communication network to convey Ethernet frames from a source to a destination, the device having at least two logical communication ports; the device supporting Connectivity Fault Management "CFM" including these aspects of CFM:
 monitoring selected Maintenance End Points "MEP";
 using CFM Maintenance Domain "MD" levels; and
 using CFM Maintenance Association ID "MAID" names;
wherein the improvement comprises:
 a Domain Listener that determines a list of active OAM domains for a particular EVC by inspecting at least some Ethernet OAM frames to obtain at least one CFM parameter for an active OAM domain;
 a Domain Manager that turns the list of active OAM domains for a particular EVC into a local configuration;
 a Peer Manager that adds a remote MEP to a remote MEP list for a relevant MEP for that device; and
 a Peer Listener that inspects at least some Ethernet OAM frames to obtain information on each remote MEP including:
 MAC address; and
 MEP ID.

22. A method for configuring a device used in a communication network to convey Ethernet frames from a source to a destination, the device having at least two logical communication ports; the device supporting Connectivity Fault Management "CFM" including these aspects of CFM:
 monitoring selected Maintenance End Points "MEP";
 using CFM Maintenance Domain "MD" levels; and
 using CFM Maintenance Association ID "MAID" names;
wherein the method comprises:
 determining a list of active OAM domains for a particular EVC by inspecting at least some Ethernet OAM frames to obtain information including:
 CFM MD level;
 CFM MAID name;
 CFM CC interval; and
 OAM directionality for an inspected frame for a particular CFM MD level and CFM MAID name;
 creating a local configuration for a particular EVC based on information associated with an active OAM domain for that particular EVC;
 inspecting at least some Ethernet OAM frames to obtain information on a remote MEP including:
 MAC address; and
 MEP ID; and
 adding the remote MEP to a remote MEP list for a relevant MEP for that device.

23. The method of claim 22 wherein the device supports CFM as implemented in IEEE 802.1ag.

24. The method of claim 22 wherein the device supports CFM as implemented in ITU-T Y.1731.

25. The method of claim 22 further comprising receiving user input to select an OAM Domain from the list of active OAM domains before creating a local configuration.

26. The method of claim 22 further wherein the step of creating a local configuration for a particular EVC based on information associated with an active OAM domain for that particular EVC automatically selects an OAM Domain to join based upon MD level.

27. The method of claim 22 further comprising receiving user input to approve the remote MEP before adding the remote MEP to the remote MEP list.

28. The method of claim 22 wherein the remote MEP is added to the remote MEP list automatically without requiring user input.

29. The method of claim 22 wherein the device inspects at least some Ethernet OAM frames but limits inspection to Ethernet OAM frames with an expected digital signature.

30. The method of claim 29 wherein the digital signature includes information based upon a timestamp to help protect against replay attacks.

31. The method of claim 22 wherein the device sends out at least some Ethernet OAM frames with a digital signature.

32. A program product comprising a non-transitory computer readable medium having embodied therein a computer program for storing data, the program product comprising: machine readable logic for installing computer program instructions for configuring a device used in a communication network to convey Ethernet frames from a source to a destination, the device having at least two logical communication ports; the device supporting Connectivity Fault Management "CFM" including these aspects of CFM:
 monitoring selected Maintenance End Points "MEP";
 using CFM Maintenance Domain "MD" levels; and
 using CFM Maintenance Association ID "MAID" names;
wherein the machine readable logic enables:
 determining a list of active OAM domains for a particular EVC by inspecting at least some Ethernet OAM frames to obtain information including:
 CFM MD level;
 CFM MAID name;
 CFM CC interval; and
 OAM directionality for an inspected frame for a particular CFM MD level and CFM MAID name;
 creating a local configuration for a particular EVC based on information associated with an active OAM domain for that particular EVC;
 inspecting at least some Ethernet OAM frames to obtain information on a remote MEP including:
 MAC address; and
 MEP ID; and
 adding the remote MEP to a remote MEP list for a relevant MEP for that device.

33. A device used in a communication network to convey Ethernet frames from a source to a destination, the device having at least two logical communication ports; the device supporting Connectivity Fault Management "CFM" including these aspects of CFM:
 monitoring selected Maintenance End Points "MEP";
 using CFM Maintenance Domain "MD" levels; and
 using CFM Maintenance Association ID "MAID" names;
wherein the improvement comprises:
 a Peer Listener that inspects at least some Ethernet OAM frames to obtain information on a remote MEP including:
 MAC address; and
 MEP ID; and
 a Peer Manager that adds the remote MEP to a remote MEP list for a relevant MEP for that device.

34. The device of claim 33 wherein one entity serves as Peer Listener and Peer Manager.

35. The device of claim 33 wherein the device supports CFM as implemented in IEEE 802.1ag.

36. The device of claim 33 wherein the device supports CFM as implemented in ITU-T Y.1731.

37. The device of claim 33 wherein the device requires user input to approve the remote MEP before adding the remote MEP to the remote MEP list.

38. The device of claim 33 wherein the device automatically adds the remote MEP to the remote MEP list without user input.

39. A device used in a communication network to convey Ethernet frames from a source to a destination, the device having at least two logical communication ports; the device supporting Connectivity Fault Management "CFM" including these aspects of CFM:
   monitoring selected Maintenance End Points "MEP";
   using CFM Maintenance Domain "MD" levels; and
   using CFM Maintenance Association ID "MAID" names;
wherein the improvement comprises:
   a Domain Listener that determines a list of active OAM domains for a particular EVC by inspecting at least some Ethernet OAM frames to obtain information including:
   CFM MD level;
   CFM MAID name;
   CFM CC interval; and
   OAM directionality for an inspected frame for a particular CFM MD level and CFM MAID name; and
   a Domain Manager that turns the list of active OAM domains for a particular EVC into a local configuration.

40. The device of claim 39 wherein one entity serves as Domain Listener and the Domain Manager.

41. The device of claim 39 wherein the device supports CFM as implemented in IEEE 802.1ag.

42. The device of claim 39 wherein the device supports CFM as implemented in ITU-T Y.1731.

43. The device of claim 39 wherein the device is configured to limit local configurations to a particular range of at least one MD level such that a device may be concerned with MD levels of interest to a customer, vendor, or infrastructure provider.

44. The device of claim 39 wherein the device receives user input to select an OAM Domain from the list of active OAM domains before creating a local configuration.

45. The device of claim 39 wherein the device automatically selects an OAM Domain from the list of active OAM domains before creating a local configuration.

46. The device of claim 45 wherein the device automatically selects an OAM Domain to join based upon MD level.

47. The device of claim 39 wherein the Domain Listener is a terminating function.

48. The device of claim 39 wherein the Domain Listener is not a terminating function.

49. The device of claim 39 wherein the local configuration created by the Domain Manager is permanently stored so that the local configuration is available after the device is rebooted.

50. The device of claim 39 wherein the device inspects at least some Ethernet OAM frames but limits inspection to Ethernet OAM frames with an expected digital signature.

51. The device of claim 50 wherein the digital signature includes information based upon a timestamp to help protect against replay attacks.

52. The device of claim 39 wherein the device sends out at least some Ethernet OAM frames with a digital signature.

53. A device used in a communication network to convey Ethernet frames from a source to a destination, the device having at least two logical communication ports; the device supporting Connectivity Fault Management "CFM" including these aspects of CFM:
   monitoring selected Maintenance Intermediate Points "MIP";
   using CFM Maintenance Domain "MD" levels; and
   using CFM Maintenance Association ID "MAID" names;
wherein the improvement comprises:
   a Domain Listener that determines a list of active OAM domains for a particular EVC by inspecting at least some Ethernet OAM frames to obtain information including:
   CFM MD level;
   CFM MAID name;
   CFM CC interval; and
   OAM directionality for an inspected frame for a particular CFM MD level and CFM MAID name; and
   a Domain Manager that turns the list of active OAM domains for a particular EVC into a local configuration.

* * * * *